P. WEEKS.
FLUID CLUTCH.
APPLICATION FILED MAR. 20, 1911.
1,021,282.
Patented Mar. 26, 1912.
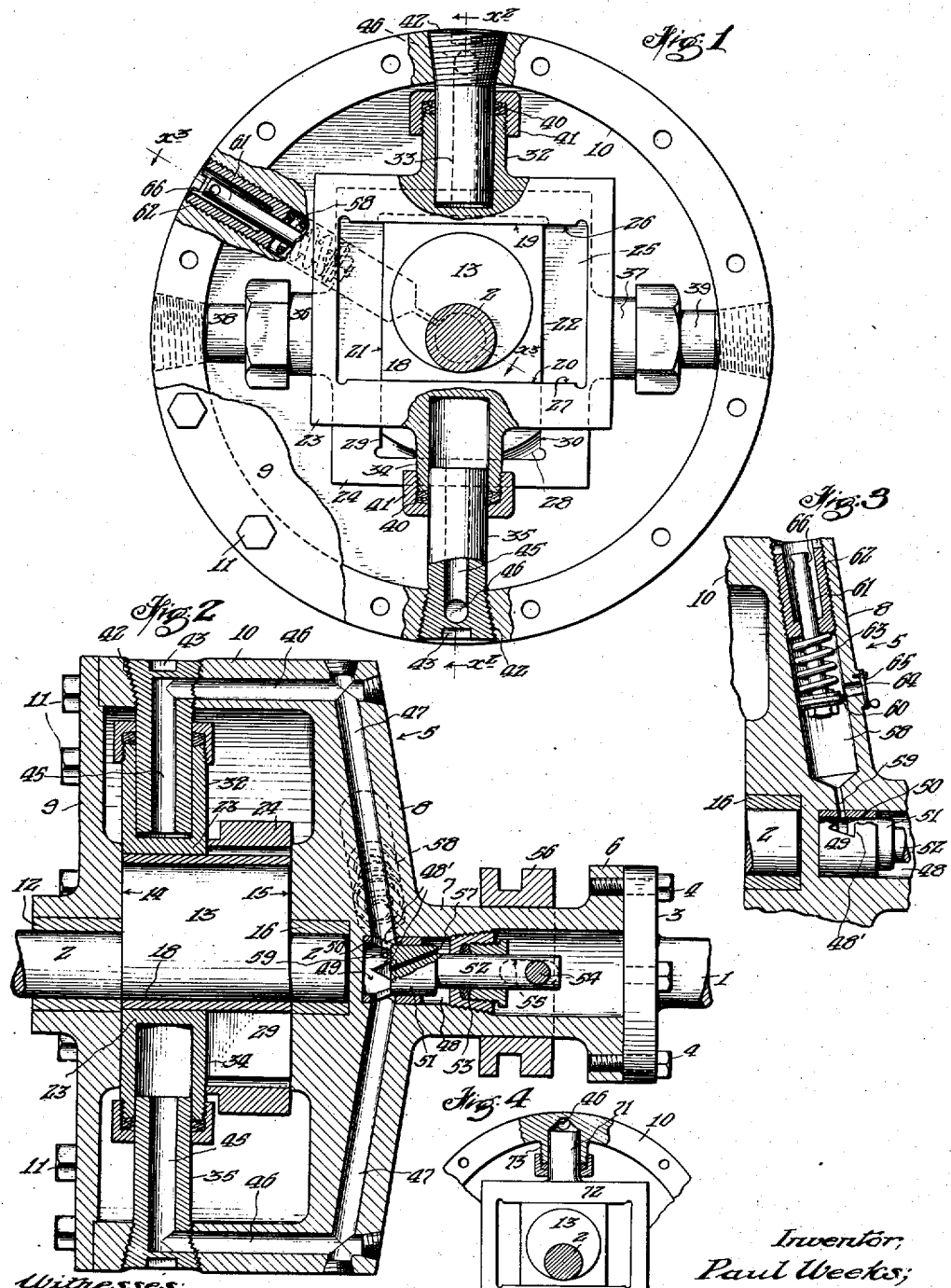
Witnesses:
M. Mansfield
J. D. Thornburgh
Inventor:
Paul Weeks;
by Townsend Haux & Hackley
attys.

UNITED STATES PATENT OFFICE.

PAUL WEEKS, OF LOS ANGELES, CALIFORNIA.

FLUID-CLUTCH.

1,021,282.  Specification of Letters Patent.  Patented Mar. 26, 1912.

Application filed March 20, 1911. Serial No. 615,784.

*To all whom it may concern:*

Be it known that I, PAUL WEEKS, a citizen of the United States, residing at Los Angeles, in the county of Los Angeles and State of California, have invented a new and useful Fluid-Clutch, of which the following is a specification.

This invention relates to a device for coupling together two rotating elements so that both of said elements rotate in unison, or for coupling the two elements together in such a manner that the driven element may be driven at a less speed than the driving element, the ratio of speed between the two elements having a range from the minimum speed of the driven element to the maximum speed of the driving element, and one of the main objects of the present invention is to produce a device of the character described of simple construction which will perform the function of clutching a driven member to a driving member, either to drive the driven element with the same speed as the driving element, or drive the driven element at any desired intermediate speed, varying from minimum speed of the driven element to the maximum speed of the driving element.

Another object of the invention is to produce a device of the character described wherein the volume of fluid or liquid used is constant.

Other objects and advantages will appear hereinafter from the following specification.

Referring to the drawings which embody one form of my invention and are drawn for illustrative purposes only: Figure 1 is an end view of the clutch showing the end plate partially broken away, also parts of the interior mechanism of the clutch broken away. Fig. 2 is a sectional view on line $x^2$—$x^2$ Fig. 1. Fig. 3 is a sectional view on line $x^3$—$x^3$ Fig. 1. Fig. 4 is a view showing a modification of the piston construction.

The driving element comprises a driving shaft 1 arranged in alinement with the driven element which consists of shaft 2. Secured to a flange 3 on the driving element 1 by means of bolts 4 is a casing 5, cylindrical in cross section. The bolts 4 extend into and engage a circular flange 6 on a hollow stem 7 which forms an extension on the end wall 8 of the casing 5. The open end of the casing 5 is closed by means of a circular end plate 9 secured to the circular wall 10 of the casing 5 by means of bolts 11. The driven element or shaft 2 extends through a bushing 12 in the end plate 9 to the interior of the casing 5 and has formed thereon an eccentric 13 extending from the inner face 14 of the plate 9 to the inner face 15 of the end wall 8, which faces form flat bearings for the ends of the eccentric 13. The inner end of the shaft 2 extends into a bushing 16 in the end wall 8 which forms a bearing or supporting member for the end of the shaft 2.

Mounted on the eccentric 13 and extending the full length thereof is a square eccentric block 18, having four bearing faces 19, 20, 21 and 22 respectively. Mounted on the eccentric block 18 are two scotch yokes 23 and 24 each of a width equal to half the width of the eccentric 13. The yoke 23 is provided with a rectangular central opening 25 having upper and lower bearing faces 26 and 27 upon which the faces 19 and 20 of the eccentric block 18 are adapted to slide. The yoke 24 is provided with a central opening 28 having opposite vertical bearing faces 29 and 30 upon which the faces 21 and 22 respectively of the eccentric block 18 are adapted to slide.

Formed on the yoke 23 and extending upwardly therefrom is a hollow extension 32 forming an open ended cylinder which is adapted to receive a piston 33 fixed to the casing 5. Formed on the yoke 23 directly opposite the extension 32 and in alinement therewith is an extension 34 forming a hollow cylinder which receives a piston 35.

The yoke 24 is provided with hollow extensions 36 and 37 extending from the opposite sides of the yoke 24 in alinement with each other, which form cylinders to receive pistons 38 and 39 respectively secured to the casing 5. Leakage from the cylinders 32, 34, 36 and 37 to the interior of the casing 5 is prevented by means of packing 40 held in place on the end of each cylinder 32, 34, 36 and 37 respectively by means of suitable nuts 41. Each piston 33, 35, 38 and 39 is formed with an enlarged head threaded to engage threaded tapered openings 42 in the wall 10 of the casing, the end of each piston being provided with a square recess 43 adapted to receive a wrench or other suitable tool for screwing the pistons securely in place in the casing. Each piston is provided with a longitudinal bore 45 which communicates at its outer end with a longitudinal passage 46 in the wall 10 of the casing. Each passage 46 communicates with a radial passage 47 which extends to a central bore 48 in the casing 5. Secured in the inner end of the bore 48 is a valve sleeve 49 provided with four V-shaped ports 48′ so arranged that each one of the ports 48′ is in alinement with one of the passages 47 thereby affording communication from the passages 47 through the ports to a chamber 50 formed within the sleeve 49.

Means for controlling the communication from the passages 47 to the interior of the sleeve 49 is provided and consists of a plunger 51 adapted to slide in the sleeve 49 over the ports 48′. The plunger 51 is provided with a stem 52 which extends through a suitable stuffing box 53 rearwardly therefrom where it is engaged by means of a pin 54 which extends through slots 55 in the extension 7 to a collar 56 slidable on the sleeve 7 by any suitable operating means not shown. For the purpose of equalizing the pressure of fluid on each side of the plunger 51, the plunger is provided with a duct or passage 57 extending through the plunger from the front to the rear thereof.

It is desirable to maintain a supply of oil to replenish any loss that may occur through leakage or in any other manner, and to attain this object a reservoir 58 is formed in the casing 5 provided with a passage 59 which extends from the inner end of the reservoir through the sleeve 49 to the chamber 50. The reservoir is circular in cross section and is provided with a plunger 60 on a stem 61 which extends through an end closure or plug 62, threaded to engage the walls of the reservoir. A spring 63 is placed between the plunger 60 and plug 62 to maintain a pressure on the oil in the reservoir. The reservoir is filled through an opening 64 provided with a suitable cover plate 65, the plunger being raised above the opening 64 by any suitable tool adapted to engage an eye 66 in the outer end of the stem 61 of the plunger. The oil passes from the reservoir to the chamber 50 to the passages 47 and 46 which distribute the oil to the cylinders until the cylinders and all passages in communication therewith are filled with oil or other suitable fluid.

It is understood that modifications may be made in the construction of the device shown without departing from the spirit of the invention, one of which modifications is shown in Fig. 4 in which the pistons 71 are secured to the yoke 72 and the cylinder formed as a part of the casing 73.

With the employment of two yokes, each yoke having the cylinders or pistons arranged thereon at 180 degrees apart and the cylinders or pistons on one yoke 90 degrees from the cylinders or pistons on the other yoke, the volume of oil in the cylinders and passages communicating therewith is constant.

The interior of the cylinders 32, 34, 36, 37, the passages 46, 47 and the valve chamber 50 are filled with fluid, preferably oil as heretofore described, and when the plunger 51 is in the position shown in Fig. 2 the oil is free to circulate in the cylinders, passages 46, 47 and the valve chamber 50 as in this position the valve ports 48′ are open. When the parts are in this position the driving shaft 1 carrying the casing 5 is free to rotate independent of the driven shaft 2 as the cylinders carried on the yokes 23 and 24 are free to reciprocate on the pistons and the yokes 23 and 24 slide on the eccentric 13 which during this operation remains stationary, the block 18 rotating on the eccentric 13. By shifting the collar 56 toward the casing 5 the pin 54 on the collar 56 being in engagement with the stem of the plunger 51 moves the plunger to partially cover the ports 48′ which retards the circulation of the oil from the cylinders through the passages 46, 47 and the valve ports 48′ which develops resistance to the free movement of the yokes and cylinders on the pistons, which resistance is compensated for by a movement of the eccentric and the driven shaft imparted to the eccentric by the block 18. It is understood that the movement imparted to the driven member or shaft 2 in this manner may be varied according to the position of the plunger which regulates the passage of oil through the ports 48′. When the plunger 51 is moved into the position where the ports 48′ are entirely closed, the oil in the cylinders and passages 46 and 47 is prevented from circulating thereby preventing movement of the cylinders on the pistons holding the block 18 stationary in the yokes 23 and 24, in which position the block 18, yokes 23 and 24, casing 5 and the driving shaft rotate as a unit, causing rotation of the eccentric 13 and shaft 2 to rotate at the same speed as the driving shaft 1.

What I claim is:

1. A driving member, a driven member, a plurality of cylinders on one of said members, connections between said cylinders to form a liquid confining space, pistons in said cylinders, an eccentric on the other member for causing a movement between the pistons and cylinders to cause the liquid to circulate from one cylinder to the other, and means for controlling the circulation of said liquid, said means consisting of a valve sleeve having ports therein registering with the connections between said cylinders, and a plunger longitudinally slidable in said sleeve to cover and uncover said ports.

2. A driving member, a driven member, a plurality of cylinders on one of said members, connections between said cylinders to form a liquid confining space, pistons in said cylinders, an eccentric on the other member for causing a movement between the pistons and cylinders to cause the liquid to circulate from one cylinder to the other, means for controlling the circulation of said liquid, means for replenishing said liquid, said means comprising a reservoir, a piston in said reservoir, a spring between said piston and the end wall of said reservoir, said reservoir having an inlet opening and means for closing said inlet opening.

3. A driving member, a casing secured to said driving member, pistons carried by said casing, a pair of yokes having oppositely disposed bearing faces, cylinders on said yokes adapted to receive said pistons, an eccentric block engaging the opposite bearing faces of said yokes, a driven member, an eccentric on said driven member in said eccentric block, said casing having passages therein communicating with said cylinders and a central chamber in the casing to form a liquid confining space, and means in said central chamber for controlling the communication between said passages.

4. A driving member, a casing secured to said driving member, hollow pistons extending inwardly from said casing, a pair of yokes having oppositely disposed bearing faces, cylinders carried on said yokes adapted to receive said pistons, an eccentric block engaging the opposite bearing faces of said yokes, a driven member, an eccentric on said driven member in said block, said casing having passages therein communicating with the cylinders through said pistons and communicating with a central chamber to form a liquid confining space, and means in the central chamber for controlling the flow of liquid through said passages.

5. A driving member, a casing secured to said driving member, hollow pistons extending inwardly from said casing, a pair of yokes having oppositely disposed bearing faces, cylinders carried on said yokes adapted to receive said pistons, an eccentric block engaging the opposite bearing faces of said yokes, a driven member, an eccentric on said driven member in said block, said casing having passages therein communicating with the cylinders through said pistons and communicating with a central chamber to form a liquid confining space, and means in the central chamber for controlling the flow of liquid through said passages, said means consisting of a valve sleeve having ports therein registering with the passages, a plunger slidable in said sleeve over said ports, and means for operating said plunger.

6. A driving shaft, a hollow casing, a stem on said casing secured to said driving shaft, hollow pistons on said casing, extending inwardly therefrom, a pair of yokes having oppositely disposed bearing faces, a pair of cylinders on each yoke adapted to receive said pistons, a square eccentric block, the sides of said block engaging the oppositely disposed bearing faces on said yokes, a driven shaft extending into said casing, an eccentric on said driven shaft in said eccentric block, said casing having passages therein communicating with said cylinders through said pistons, and with a central chamber in the casing to form a liquid confining space, a valve sleeve in said central chamber having ports therein registering with said passages in the casing, and a plunger in said valve sleeve slidable past said ports.

7. A driving shaft, a hollow casing, a hollow stem on said casing secured to said driving shaft, hollow pistons on said casing extending inwardly therefrom, a pair of yokes having oppositely disposed bearing faces, a pair of cylinders on each yoke adapted to receive said pistons, a square eccentric block, the sides of said block engaging the oppositely disposed bearing faces on said yokes, a driven shaft extending into said casing, an eccentric on said driven shaft in said eccentric block, said casing having passages therein communicating with said cylinders through said pistons and with a central chamber in the casing to form a liquid confining space, a valve sleeve in said central chamber having ports therein registering with said passages in the casing, a plunger in said valve sleeve slidable past said ports, a stem on said plunger extending into the hollow extension on the casing, a pin on said stem extending through the slots in said casing, and a longitudinally slidable collar on said hollow extension for operating said plunger.

8. A driving shaft, a hollow casing, a hollow stem on said casing secured to said driving shaft, hollow pistons on said casing extending inwardly therefrom, a pair of yokes having oppositely disposed bearing faces, a pair of cylinders on each yoke adapted to receive said pistons, a square eccentric block, the sides of said block engaging the oppositely disposed bearing faces on said yokes, a driven shaft extending into said casing, an eccentric on said driven shaft in said eccentric block, said casing having passages therein communicating with said cylinders through said pistons and with a central chamber in the casing to form a liquid confining space, a valve sleeve in said central chamber having ports therein registering with said passages in the casing, a plunger in said valve sleeve slidable past said ports, a stem on said plunger extending into the hollow extension on the casing, a pin on said stem extending through the slots in said casing, a longitudinally slidable collar on said hollow extension for operating said plunger, a reservoir in said casing having a passage communicating with said central chamber, a piston in said reservoir, and a spring between said piston and the end of the reservoir.

In testimony whereof, I have hereunto set my hand at Los Angeles, California, this 10th day of March, 1911.

PAUL WEEKS.

In presence of—
 FRANK L. A. GRAHAM,
 ARTHUR P. KNIGHT.